United States Patent
Shu

(10) Patent No.: US 11,716,438 B2
(45) Date of Patent: Aug. 1, 2023

(54) METHOD FOR MOTION ESTIMATION, NON-TRANSITORY COMPUTER-READABLE STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Wenting Shu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 246 days.

(21) Appl. No.: 17/216,633

(22) Filed: Mar. 29, 2021

(65) Prior Publication Data
US 2021/0306528 A1    Sep. 30, 2021

(30) Foreign Application Priority Data
Mar. 30, 2020 (CN) .......................... 202010239649.4

(51) Int. Cl.
*H04N 19/51* (2014.01)
*H04N 5/14* (2006.01)

(52) U.S. Cl.
CPC ............. *H04N 5/145* (2013.01); *H04N 19/51* (2014.11)

(58) Field of Classification Search
CPC .... H04N 19/51; H04N 19/533; H04N 19/557; H04N 19/56; H04N 19/57; H04N 5/145
See application file for complete search history.

(56) References Cited

U.S. PATENT DOCUMENTS 6,377,623 B1 * 4/2002 Ra .......................... H04N 19/53
375/240
8,295,551 B2 * 10/2012 Lertrattanapanich ... G06T 7/238
382/107
(Continued)

FOREIGN PATENT DOCUMENTS

CN        1381026        11/2002
CN        1578469        2/2005
(Continued)

OTHER PUBLICATIONS

WIPO, International Search Report and Written Opinion for PCT/CN2021/083327, dated Jun. 29, 2021.
(Continued)

*Primary Examiner* — Jeremiah C Hallenbeck-Huber
(74) *Attorney, Agent, or Firm* — Hodgson Russ LLP

(57) ABSTRACT

A method for motion estimation, a non-transitory computer-readable storage medium, and an electronic device are provided. The method includes the following. An error between a block to be matched and each of reference blocks is determined to obtain multiple errors. At least one candidate block is determined from the reference blocks according to the multiple errors. A random number range is determined according to a displacement between the block to be matched and each of the reference blocks. Random motion vectors are obtained by using a motion vector between the block to be matched and each of the at least one candidate block as a basic motion vector and random numbers within the random number range as increments. A target motion vector corresponding to the block to be matched is determined according to the random motion vectors.

20 Claims, 6 Drawing Sheets

(56) References Cited

U.S. PATENT DOCUMENTS

| | | | | |
|---|---|---|---|---|
| 8,494,052 | B2* | 7/2013 | Chang | H04N 19/51 |
| | | | | 375/240.26 |
| 8,934,544 | B1* | 1/2015 | Wang | H04N 19/11 |
| | | | | 375/240.13 |
| 2005/0226462 | A1* | 10/2005 | Wittebrood | H04N 19/51 |
| | | | | 382/103 |
| 2008/0240243 | A1 | 10/2008 | Chang | |
| 2009/0190037 | A1 | 7/2009 | Chang et al. | |
| 2009/0316786 | A1* | 12/2009 | Bosma | H04N 19/56 |
| | | | | 375/240.16 |
| 2012/0008689 | A1* | 1/2012 | Nasu | H04N 19/132 |
| | | | | 375/E7.104 |
| 2012/0057760 | A1 | 3/2012 | Yamamoto et al. | |
| 2015/0110190 | A1* | 4/2015 | Sartor | H04N 19/527 |
| | | | | 375/240.16 |
| 2018/0184107 | A1* | 6/2018 | Hu | H04N 19/56 |
| 2019/0045192 | A1* | 2/2019 | Socek | H04N 19/573 |
| 2020/0014945 | A1 | 1/2020 | Levi et al. | |
| 2020/0021841 | A1* | 1/2020 | Leontaris | H04N 19/105 |
| 2020/0021842 | A1* | 1/2020 | Leontaris | H04N 19/527 |

FOREIGN PATENT DOCUMENTS

| | | | | |
|---|---|---|---|---|
| CN | 1863272 | | 11/2006 | |
| CN | 102316317 | | 1/2012 | |
| CN | 102438146 | | 4/2014 | |
| CN | 104054350 | | 9/2014 | |
| CN | 104995917 | | 10/2015 | |
| CN | 106993108 | | 7/2017 | |
| CN | 107124617 | | 9/2017 | |
| CN | 108141604 | | 6/2018 | |
| CN | 108270945 A | * | 7/2018 | H04N 19/86 |
| CN | 108702512 | | 10/2018 | |
| CN | 110839155 | | 2/2020 | |

OTHER PUBLICATIONS

Khawase et al., "An Overview of Block Matching Algorithms for Motion Vector Estimation," Proceedings of the Second International Conference on Research in Intelligent and Computing in Engineering, ACSIS, 2017, vol. 10, pp. 217-222.

Boltz et al., "Randomized motion estimation," Proceedings of IEEE 17th International Conference on Image Processing, 2010, pp. 781-784.

Kondo et al., "A Block Matching Technique Using Unit Gradient Vectors," Conference on Machine Vision Applications (MVA), 2009, pp. 390-393.

EPO, Extended European Search Report for EP Application No. 21165685.5, dated Aug. 2, 2021.

CNIPA, First Office Action for CN Application No. 202010239649.4, dated Feb. 15, 2023.

\* cited by examiner

METHOD FOR MOTION ESTIMATION, NON-TRANSITORY COMPUTER-READABLE STORAGE MEDIUM, AND ELECTRONIC DEVICE

CROSS-REFERENCE TO RELATED APPLICATION(S)

This application claims priority to Chinese Application Patent No. 202010239649.4, filed on Mar. 30, 2020, the entire disclosure of which is incorporated herein by reference.

TECHNICAL FIELD

This disclosure relates to the technical field of image and video processing, and more particularly to a method for motion estimation, a non-transitory computer-readable storage medium, and an electronic device.

BACKGROUND

Motion estimation is to calculate a relative offset of a target object of consecutive image frames in a video to obtain a motion vector of the target object. The motion estimation is widely used in various fields, such as video coding, motion compensation, video frame interpolation, and the like.

In related art, to realize motion estimation, each frame in image sequence is generally divided into multiple blocks that are not overlapped with each other, and displacements of all pixel points in each block are considered to be the same. Thereafter, similar blocks corresponding to a current block are determined within a given range of reference frames, and thus a motion vector between the current block and each of the similar blocks is obtained. However, the method has poor adaptability for different scenarios, which may be difficult to obtain effective motion vectors.

SUMMARY

According to a first aspect, a method for motion estimation is provided. The method includes the following. An error between a block to be matched and each of reference blocks is determined to obtain multiple errors, where the block to be matched is an image block in a current frame, and the reference blocks are image blocks in a reference frame corresponding to the current frame. At least one candidate block is determined from the reference blocks according to the multiple errors. A random number range is determined according to a displacement between the block to be matched and each of the reference blocks. Random motion vectors are obtained by using a motion vector between the block to be matched and each of the at least one candidate block as a basic motion vector and random numbers within the random number range as increments. A target motion vector corresponding to the block to be matched is determined according to the random motion vectors.

According to a second aspect, an electronic device is provided. The electronic device includes at least one processor and a non-transitory computer readable storage. The non-transitory computer readable storage is coupled to the at least one processor and storing at least one computer executable instruction which, when executed by the at least one processor, causes the at least one processor to: determine an error between a block to be matched and each of reference blocks to obtain multiple errors, where the block to be matched is an image block in a current frame and the reference blocks are image blocks in a reference frame corresponding to the current frame; determine at least one candidate block from the reference blocks according to the multiple errors; determine a random number range according to a displacement between the block to be matched and each of the reference blocks; obtain random motion vectors by using a motion vector between the block to be matched and each of the at least one candidate block as a basic motion vector and random numbers within the random number range as increments; determine a target motion vector corresponding to the block to be matched according to the random motion vectors.

According to a third aspect, a non-transitory computer-readable storage medium is provided. The non-transitory computer-readable storage medium stores computer programs which, when executed by a processor, are operable with the processor to: determine an error between a block to be matched and each of reference blocks to obtain multiple errors, where the block to be matched is an image block in a current frame and the reference blocks are image blocks in a reference frame corresponding to the current frame; determine at least one candidate block from the reference blocks according to the multiple errors; determine a random number range according to a displacement between the block to be matched and each of the reference blocks; obtain random motion vectors by using a motion vector between the block to be matched and each of the at least one candidate block as a basic motion vector and random numbers within the random number range as increments; determine a target motion vector corresponding to the block to be matched according to the random motion vectors.

BRIEF DESCRIPTION OF THE DRAWINGS

The accompanying drawings herein are incorporated into the specification and constitute a part of the specification and illustrate some implementations of the disclosure. The accompanying drawings together with the specification are used for explaining the principle of the disclosure. Apparently, the accompanying drawings described below merely illustrate some implementations. Those of ordinary skill in the art can also obtain other accompanying drawings based on the accompanying drawings described below without creative efforts.

DETAILED DESCRIPTION

Figure 1:
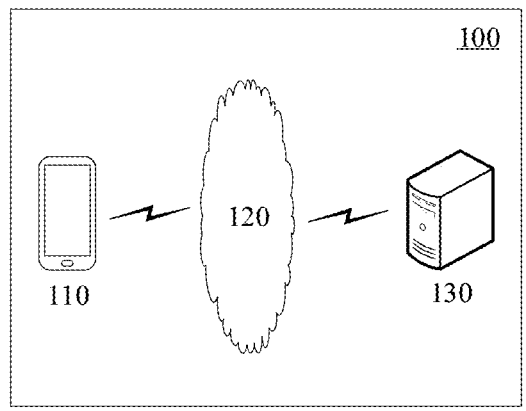
FIG. 1 is a system architecture diagram of an operating environment according to implementations.

The following will describe exemplary implementations with reference to the accompanying drawings in detail. The exemplary implementations can be implemented in various forms, and should not be construed as being limited to examples set forth herein. On the contrary, the implementations provided herein make the disclosure more comprehensive and complete, and the concept of the exemplary implementations is allowed to be fully conveyed to those skilled in the art. The described features, structures, or characteristics may be combined in one or more implementations in any suitable way. In the following description, specific details are provided to give a sufficient understanding of the implementations of the disclosure. However, those skilled in the art will realize that the technical solutions of the disclosure can be practiced without one or more of the specific details, or can be practiced with other methods, components, devices, steps, or the like. In other cases, known technical solutions are not illustrated or described in detail in order to avoid obscure various aspects of the disclosure.

In addition, the accompanying drawings are merely schematic illustrations of the disclosure and are not necessarily drawn to scale. The same reference numerals in the figures indicate the same or similar parts, and thus repeated description will be omitted. Some block diagrams illustrated in the accompanying drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

Implementations of the disclosure provide a method and device for motion estimation. FIG. 1 is a system architecture diagram of an operating environment of the method and device according to implementations. As illustrated in FIG. 1, a system architecture 100 may include a terminal 110, a network 120, and a server 130. The terminal 110 may be an electronic device with a video shooting function, including but not limited to a mobile phone, a tablet computer, a digital camera, a personal computer, or the like. The network 120 is used as a medium for providing a communication link between the terminal 110 and the server 130. The connection provided by the network 120 may be various connection types, such as wired communication links, wireless communication links, or fiber optic cables. It should be understood that the number of terminals, the number of networks, and the number of servers in FIG. 1 are merely illustrative. There may be any number of terminals, networks, and servers according to actual needs. For example, the server 130 may be a server cluster including multiple servers.

The method for motion estimation provided herein may be implemented by the terminal 110, for example, after the terminal 110 captures a video, the motion estimation is performed on the video. Alternatively, the method may be implemented by the server 130, for example, after the terminal 110 captures the video, the terminal 110 can upload the video to the server 130, such that the server 130 can perform motion estimation on the video. It should be noted that if the above-mentioned method for motion estimation is implemented by the terminal 110, the terminal 110 may be a stand-alone device (that is, the terminal 110 does not need to have a network connection function), or the terminal 110 can be operated in a non-networked state.

Implementations of the disclosure further provide an electronic device for implementing the method and device for motion estimation described above. The electronic device may be the terminal 110 or the server 130 in FIG. 1. The electronic device can be implemented in various forms, for example, the electronic device may include a mobile device such as a smart phone, a tablet computer, a laptop, a personal digital assistant (PDA), a navigation device, a wearable device, or an unmanned aerial vehicle/drone (UAV), or a fixed device such as a desktop computer or a smart television. The following describes a mobile terminal 200 in FIG. 2 as an example of the electronic device to illustrate structures of the electronic device. Those skilled in the art should understand that configuration illustrated in FIG. 2 can be applied to fixed-type equipment in addition to parts used for mobile purposes. In other implementations, the mobile terminal 200 may include more or fewer components than illustrated, or certain components may be combined, or some components may be divided, or different component arrangements may be adopted. The illustrated components can be implemented in the form of hardware, software, or a combination of software and hardware. The interface connection relationship between the components is merely illustrative, and does not constitute a structural limitation of the mobile terminal 200. In other examples, the mobile terminal 200 may also adopt an interface connection different from that in FIG. 2 or may adopt multiple interface connections.

Figure 2:
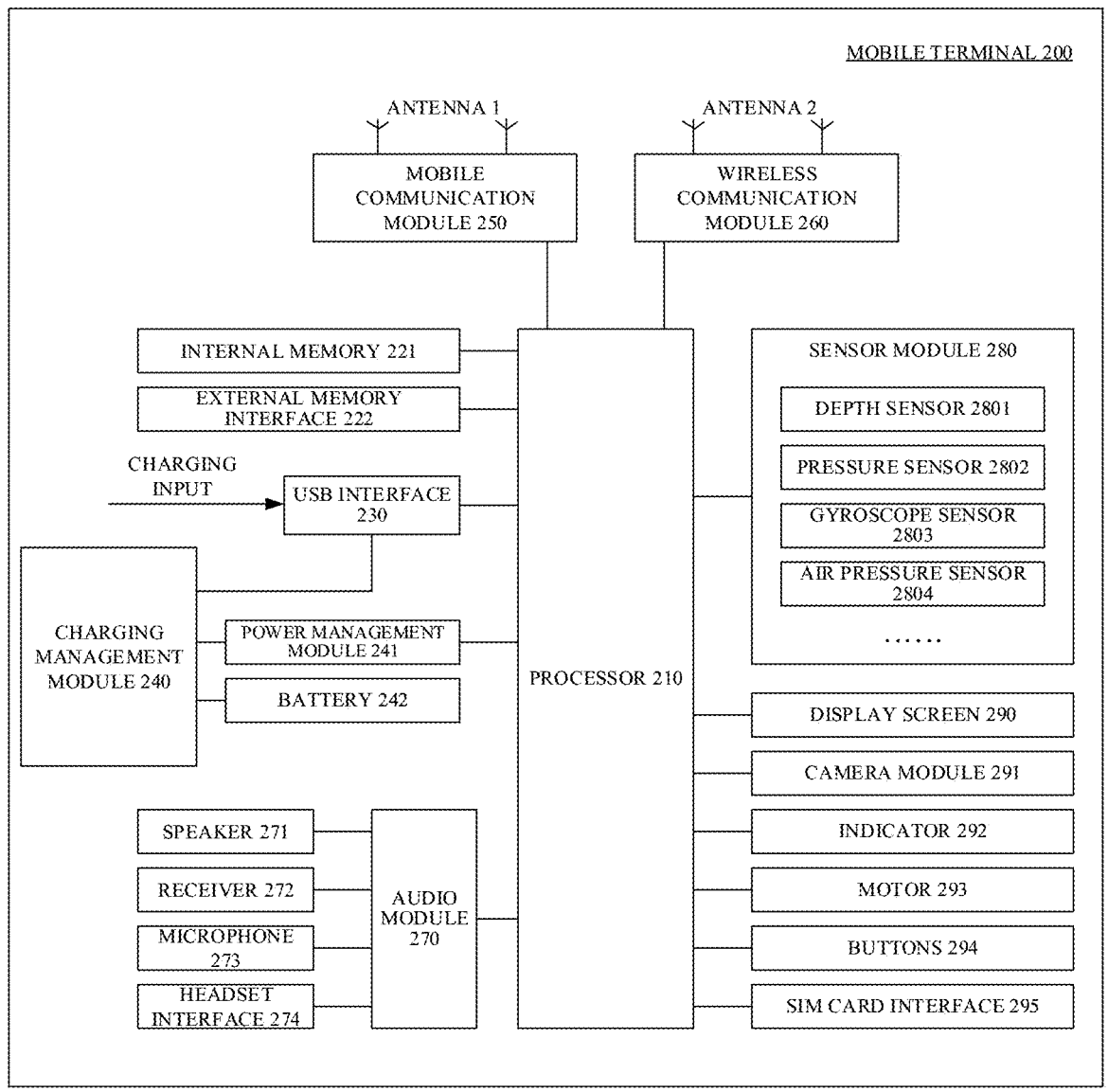
FIG. 2 is a schematic structural diagram illustrating an electronic device according to implementations.

As illustrated in FIG. 2, the mobile terminal 200 may include at least one processor (such as a processor 210), an internal memory 221, an external memory interface 222, a universal serial bus (USB) interface 230, a charging management module 240, a power management module 241, a battery 242, an antenna 1, an antenna 2, a mobile communication module 250, a wireless communication module 260, an audio module 270, a speaker 271, a receiver 272, a microphone 273, a headset interface 274, a sensor module 280, a display screen 290, a camera module 291, an indicator 292, a motor 293, buttons 294, and a subscriber identification module (SIM) card interface 295, and so on. The sensor module 280 may include a depth sensor 2801, a pressure sensor 2802, a gyroscope sensor 2803, an air pressure sensor 2804, and the like.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural-network processing unit (NPU), and the like. The processing units may be independent devices or can be integrated in one or more processors.

The controller can generate operation control signals according to instruction operation codes and timing signals to control reading and execution of instructions.

A non-transitory computer readable storage (such as a memory) can also be provided in the processor 210 for storing instructions and data. The memory can store instructions for implementing six modularized functions, where the instructions include detection instructions, connection instructions, information management instructions, analysis instructions, data transmission instructions, and notification instructions, and the instructions may be executed by the processor 210. In one example, the memory in the processor 210 is a cache memory. The memory can store instructions or data that have just been used or can be recycled by the processor 210. If the processor 210 needs to use the instructions or data again, the instructions or data can be directly invoked from the memory, which may avoid repeated accesses and reduce waiting time of the processor 210, thereby improving efficiency of the system.

In addition, the processor 210 may include one or more interfaces. The one or more interfaces may include an inter-integrated circuit (I2C) interface, an inter-integrated circuit sound (I2S) interface, a pulse code modulation (PCM) interface, an universal asynchronous receiver/transmitter (UART) interface, a mobile industry processor Interface (MIPI), a general-purpose input/output (GPIO) interface, a subscriber identity module (SIM) interface, and/or a USB interface, and the like. The processor and other components of the mobile terminal 200 are coupled together through different interfaces.

The USB interface 230 is an interface that complies with the USB standard specification. The USB interface 230 may be a miniUSB interface, a microUSB interface, an USB-TypeC interface, or the like. The USB interface 230 can be configured to be connected to a charger to charge the mobile terminal 200, or connected to an earphone to play audio through the earphone, and can be further configured to connect the mobile terminal 200 to other electronic devices, such as a computer, a peripheral, or the like.

The charging management module 240 is configured to receive charging input from the charger, where the charger may be a wireless charger or a wired charger. In some examples of wired charging, the charging management module 240 may receive charging input from the wired charger through the USB interface 230. In some examples of wireless charging, the charging management module 240 may receive wireless charging input through wireless charging coils of the mobile terminal 200. While charging the battery 242, the charging management module 240 can also supply power to the electronic device through the power management module 241.

The power management module 241 is configured to connect the battery 242 and the charging management module 240 to the processor 210. The power management module 241 is configured to receive input from the battery 242 and/or the charging management module 240, to supply power to the processor 210, the internal memory 221, the display screen 290, the camera module 291, and the wireless communication module 260. In addition, the power management module 241 can be further configured to monitor battery capacity, battery cycle times, battery health status (e.g., leakage, impedance), and other parameters.

The wireless communication function of the mobile terminal 200 may be implemented by the antenna 1, the antenna 2, the mobile communication module 250, the wireless communication module 260, the modem processor, and the baseband processor.

The antenna 1 and the antenna 2 are configured to transmit and receive electromagnetic wave signals. Each antenna in the mobile terminal 200 can be configured to cover a single communication frequency band or multiple communication frequency bands. The antenna can be multiplexed to improve antenna utilization. For example, the antenna 1 can be multiplexed as a diversity antenna of a wireless local area network. In other examples, the antennas can be used in combination with a tuning switch.

The mobile communication module 250 can provide a solution for wireless communication that can be applied to the mobile terminal 200, where the wireless communication may include 2-generation wireless telephone technology (2G)/3G/4G/5G and the like. The mobile communication module 250 may include at least a filter, at least a switch, at least a power amplifier, at least a low noise amplifier (LNA), and the like. The mobile communication module 250 can be configured to receive electromagnetic waves via the antenna 1, perform filtering and amplifying processing on the received electromagnetic waves, and then transmit the electromagnetic waves subjected to the filtering and amplifying processing to the modem processor for demodulation. The mobile communication module 250 can be further configured to amplify signals modulated by the modem processor. The signals after amplifying are converted, via the antenna 1, into electromagnetic waves and the electromagnetic waves are radiated out.

The wireless communication module 260 can provide a solution for wireless communication that can be applied to the mobile terminal 200, where the wireless communication may include wireless local area networks (WLAN) (such as wireless fidelity (Wi-Fi) networks), bluetooth (BT), a global navigation satellite system (GNSS), a frequency modulation (FM), near field communication (NFC) technology, infrared (IR) technology, and the like. The wireless communication module 260 may be one or more devices that are integrated with at least one communication processing module. The wireless communication module 260 can be configured to receive electromagnetic waves via the antenna 2, perform frequency modulation and filtering processing on the electromagnetic wave signals, and then send the signals subjected to frequency modulation and filtering processing to the processor 210. The wireless communication module 260 can be further configured to receive from the processor 210 signals, and perform frequency modulation and amplifying processing on the signals. The signals subjected to the frequency modulation and amplifying processing is converted, via the antenna 2, into electromagnetic waves and the electromagnetic waves are radiated out.

In some examples, the antenna 1 of the mobile terminal 200 is coupled with the mobile communication module 250, and the antenna 2 is coupled with the wireless communication module 260, so that the mobile terminal 200 can communicate with the network and other devices through wireless communication technology. The wireless communication technology may include global system for mobile communications (GSM), general packet radio service (GPRS), code division multiple access (CDMA), wideband code division multiple access (WCDMA), time division-synchronous code division multiple access (TD-SCDMA), long term evolution (LTE), new radio (NR), BT, GNSS, WLAN, NFC, FM, and/or IR technology, or the like. The GNSS may include global positioning system (GPS), global navigation satellite system (GLONASS), beidou navigation satellite system (BDS), quasi-zenith satellite system (QZSS), and/or satellite based augmentation systems (SBAS).

The mobile terminal 200 can implement a display function through the GPU, the display screen 290, and the application processor. The GPU, i.e., a microprocessor, is configured to connect the display screen 290 and the application processor. The GPU is configured to perform mathematical and geometric calculations for graphics rendering. The processor 210 may include one or more GPUs that are configured to execute program instructions to generate or change display information.

The mobile terminal 200 may include one or more display screens 290 for displaying images, videos, or the like. The display screen 290 includes a display panel. The display panel is a liquid crystal display (LCD) display, an organic light-emitting diode (OLED) display, an active-matrix OLED (AMOLED) display, a flexlight-emitting diode (FLED) display, a miniLED display, a microLED display, a micro-OLED display, a quantum dot light-emitting diode (QLED) display, or the like.

The mobile terminal 200 can implement a shooting function through the ISP, the camera module 291, the video codec, the GPU, the display screen 290, and the application processor.

The ISP is configured to process data fed back by the camera module 291. For example, during taking a picture, a shutter is opened, light passes through a lens and reaches a photosensitive element of the camera module, the photosensitive element coverts light signals into electrical signals and transfers the electrical signals to the ISP for processing, and the ISP converts the electrical signals into a visible image. In some examples, the ISP may be provided in the camera module 291.

The mobile terminal 200 may include one or more camera modules 291 for capturing static images or videos. For example, an optical image of an object can be generated through lights passing the lens and reaching the photosensitive element. The photosensitive element converts optical signals into electrical signals, and then transfers the electrical signals to the ISP, and the ISP converts the electrical signals into digital image signals and outputs the digital image signals to the DSP for processing. The DSP converts the digital image signals into image signals of a standard RGB format or YUV format, or other formats.

The video codec is configured to compress or decompress a digital video. The mobile terminal 200 may support one or more video codecs. In this way, the mobile terminal 200 can play or record videos of multiple encoding formats, for example, moving picture experts group (MPEG) 1, MPEG2, MPEG3, MPEG4, or the like.

The external memory interface 222 can be configured to connect an external memory card, such as a Micro SD card, to expand storage capability of the mobile terminal 200. The external memory card can communicate with the processor 210 through the external memory interface 222 to realize a data storage function. For example, music, video, and other files can be saved in the external memory card.

The internal memory 221 may be configured to store computer executable program codes including instructions. The internal memory 221 may include a program storage region and a data storage region, where the program storage region may store the operating system, applications required for at least one function (such as a sound playback application, an image playback application, etc.), and the like. The data storage region may store data (such as audio data, contact list, etc.) created during use of the mobile terminal 200, and so on. In addition, the internal memory 221 may include a high-speed random access memory (RAM), and may further include a non-transitory memory such as at least one disk storage device, a flash device, universal flash storage (UFS), or the like. The processor 210 executes various functional applications and data processing of the mobile terminal 200 by running instructions stored in the internal memory 221 and/or instructions stored in the memory that is provided in the processor.

The mobile terminal 200 can implement audio functions (for example, music playing, sound recording, or the like) through the audio module 270, the speaker 271, the receiver 272, the microphone 273, the headset interface 274, the application processor, and the like.

The audio module 270 is configured to convert digital audio information into an analog audio signal and output the analog audio signal, or configured to convert an analog audio input into a digital audio signal. The audio module 270 is further configured to encode and decode audio signals. In some examples, the audio module 270 may be disposed in the processor 210, or part of functional modules of the audio module 270 may be disposed in the processor 210.

The speaker 271 (also called a "horn") is configured to convert audio electrical signals into sound signals. The mobile terminal 200 can play music or a hands-free call through the speaker 271.

The receiver 272 (also called an "earpiece") is configured to convert audio electrical signals into sound signals. When answering a call or voice message via the mobile terminal 200, the user can answer the voice by raising the mobile terminal 200 provided with the receiver 272 close to the human ear.

The microphone 273 (also called "megaphone" or "sonic transducer") is configured to convert sound signals into electric signals. When making a call or sending voice message, the user can make a sound by enabling the microphone 273 to be close to the mouth, to input the sound signal to the microphone 273. The mobile terminal 200 may be provided with multiple microphones 273 to implement functions such as noise reduction, sound source identification, and directional recording.

The headset interface 274 is configured to connect wired earphones. The headset interface 274 may be a USB interface 230, or an open mobile terminal platform (OMTP) standard interface of 3.5 mm, or a cellular telecommunications industry association of the USA (CTIA) standard interface.

The depth sensor 2801 is configured to obtain depth information of scenery. In some examples, the depth sensor may be provided in the camera module 291. The pressure sensor 2802 is configured to detect pressure signals and convert the pressure signals into electrical signals for implementing functions such as pressure touch. The gyroscope sensor 2803 can be configured to determine a motion posture of the mobile terminal 200, and can be configured for shooting anti-shake scenes, navigation, and somatosensory games. The air pressure sensor 2804 is configured to measure air pressure, and can assist positioning and navigation by calculating elevation.

In addition, according to actual needs, the sensor module 280 can be provided with sensors with other functions, such as a magnetic sensor, an acceleration sensor, a distance sensor, a proximity light sensor, a fingerprint sensor, a temperature sensor, a touch sensor, an ambient light sensor, a bone conduction sensor, and so on.

The indicator 292 may be an indicator light, which can be configured to indicate charging status, power changes, and can also be configured to indicate messages, missed calls, notifications, and so on.

The motor 293 can generate vibration reminding for incoming calls, alarm clocks, and received messages, and can also be used for touch vibration feedback.

The buttons 294 include a power button, a volume button, and so on. The buttons 294 may be mechanical buttons or touch buttons. The mobile terminal 200 may receive key input and generate key signal input related to user settings and function control of the mobile terminal 200.

The mobile terminal 200 may support one or more SIM card interfaces 295 for connecting to SIM cards, so that the mobile terminal 200 can interact with the network through the SIM cards to realize call and data communication functions.

The following will describe the method and device for motion estimation of exemplary implementations of the disclosure in detail.

Figures 3, 4:
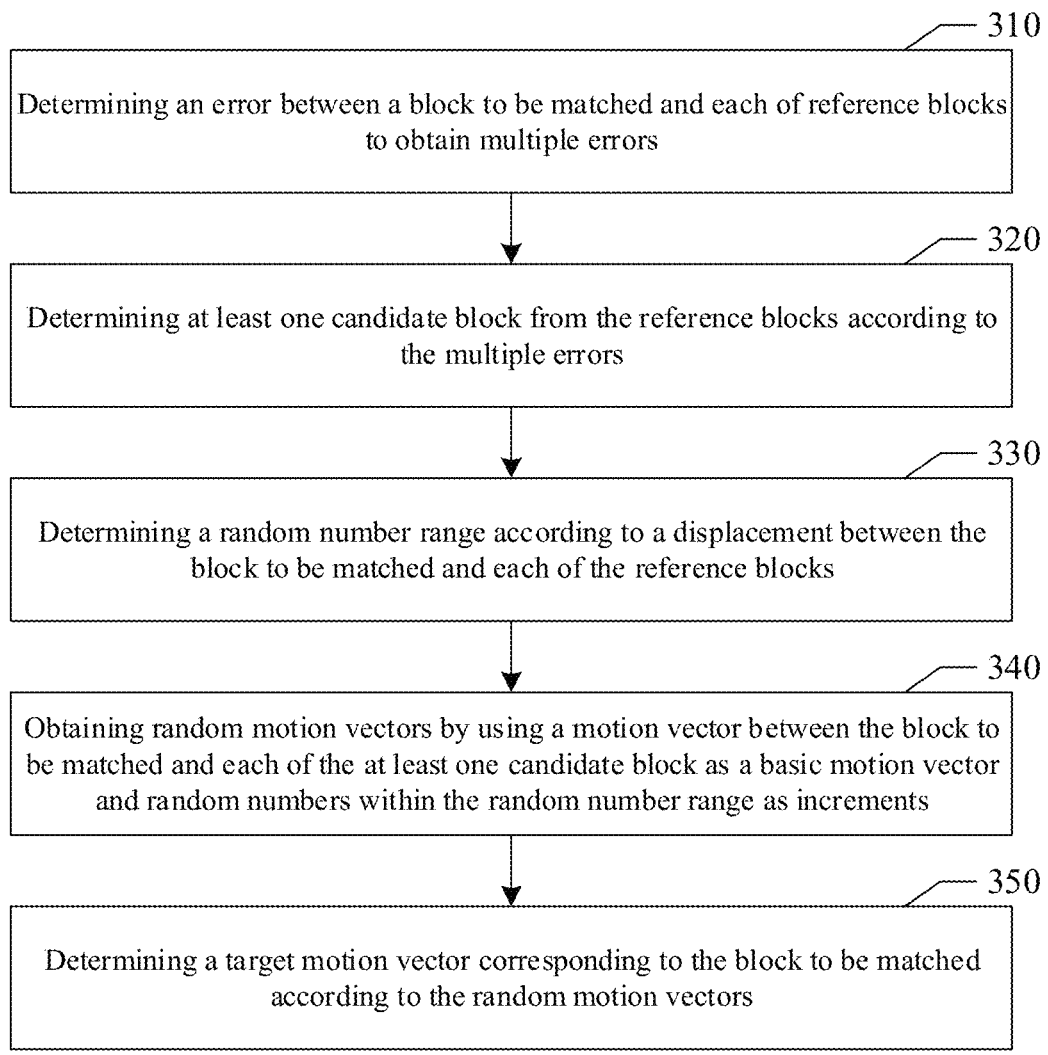
FIG. 3 is a flow chart illustrating a method for motion estimation according to implementations.
FIG. 4 is a schematic diagram illustrating reference blocks according to implementations.

FIG. 3 is a flow chart illustrating a method for motion estimation according to implementations. As illustrated in FIG. 3, the method begins at block 310.

At block 310, an error between a block to be matched and each of reference blocks is determined to obtain multiple errors.

In one example, the block to be matched is an image block in a current frame, and the reference blocks are image blocks in a reference frame corresponding to the current frame. The current frame refers to a frame that is currently to be processed in a video. If motion estimation is performed during video shooting, a latest frame acquired is the current frame. Alternatively, during parsing the video frame by frame, a frame that is currently to be parsed is the current frame. The reference frame may be a frame adjacent to the current frame in the video, generally a previous frame. For the current frame, the image can be divided according to a preset size (such as a size of 16*16) to obtain multiple image blocks. Alternatively, the image can be divided in multiple manners such as target detection and semantic segmentation to obtain multiple image blocks. The disclosure is not limited thereto. After the current frame is divided into the multiple image blocks, each image block can be considered as a block to be matched, to perform motion estimation according to exemplary implementations. During determining the reference blocks, the block to be matched is generally taken as a center and moved by a certain step size in all directions, and in the reference frame an image block that locates at a position of the block to-be-matched after being moved is determined as the reference block. In one example, to simplify calculation, as illustrated in FIG. 4, eight adjacent image blocks S1 to S8 around the block to be matched 50 may be extracted from the reference frame to obtain eight reference blocks.

The motion estimation is to find a reference block (referred to as an optimal block herein) that matches the block to be matched best. The reference blocks in operations at block 310 are preliminarily determined, so they are less likely to contain the optimal block. In implementations of the disclosure, the error between the block to be matched and each reference block is determined, so as to determine a matching degree between the block to be matched and each reference block. In at least one implementation, the error between the block to be matched and any one of the reference blocks is determined according to one or more of following error terms: a sum of absolute differences (SAD), a gradient difference, a penalty value, or a Euclidean distance.

The following describes a calculation manner of each error term.

About SAD: for each of pixel points of the block to be matched, an absolute value of a difference between a pixel value of the pixel point of the block to be matched and a pixel value of a corresponding pixel point in the reference block is calculated, and absolute values calculated for the pixel points of the block to be matched are summed to obtain the SAD between the block to be matched and the reference block.

Figure 5:
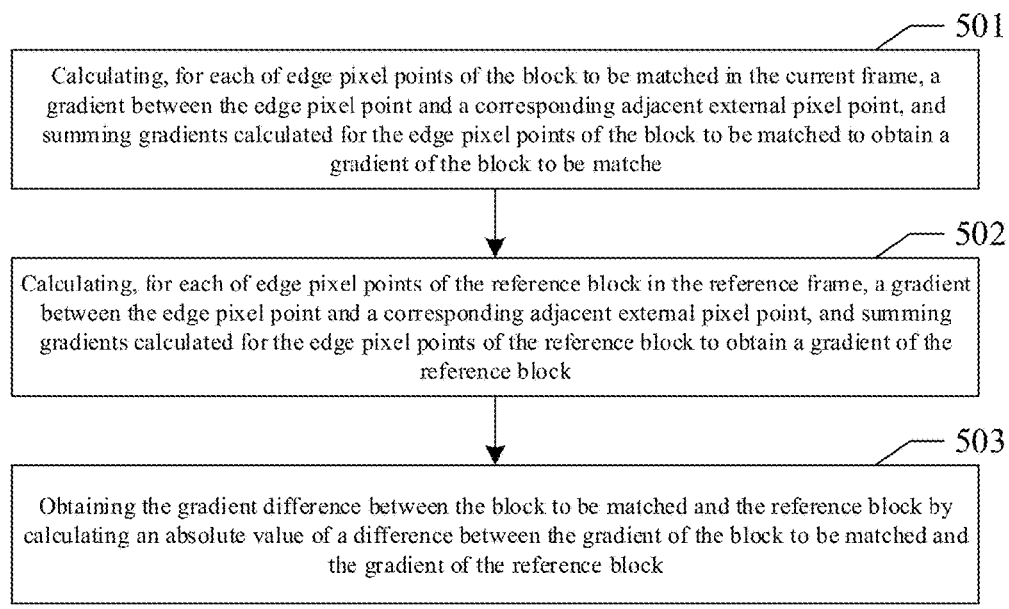
FIG. 5 is a flow chart illustrating determining of a gradient difference according to implementations.

About gradient difference: as illustrated in FIG. 5, the gradient difference is determined according to operations at block 501 to block 503.

At block 501, for each of edge pixel points of the block to be matched in the current frame, a gradient between the edge pixel point and a corresponding adjacent external pixel point is calculated, and gradients calculated for the edge pixel points of the block to be matched are summed to obtain a gradient of the block to be matched.

At block 502, for each of edge pixel points of the reference block in the reference frame, a gradient between the edge pixel point and a corresponding adjacent external pixel point is calculated, and gradients calculated for the edge pixel points of the reference block are summed to obtain a gradient of the reference block.

At block 503, the gradient difference between the block to be matched and the reference block is obtained by calculating an absolute value of a difference between the gradient of the block to be matched and the gradient of the reference block.

In one example, the block to be matched and the reference blocks are generally square or rectangular. The edge pixel points refer to pixel points that locate on top, bottom, left, and right edges of the block to be matched or the reference block. The adjacent external pixel points refer to pixel points that locate outside the block to be matched or the reference block and are adjacent to the edge pixel points.

Figure 6:
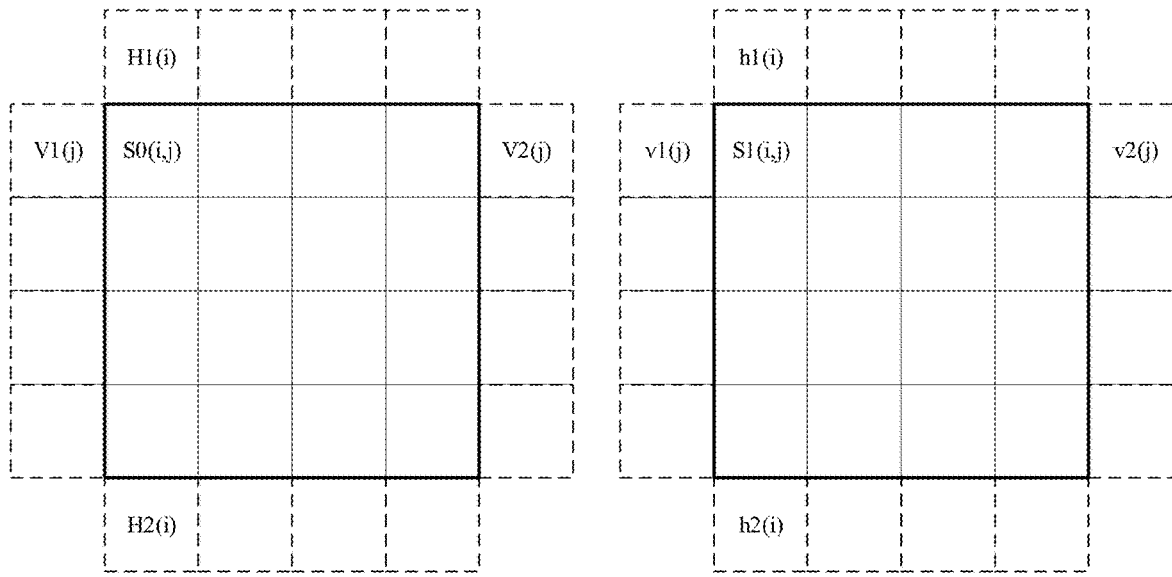
FIG. 6 is schematic diagram illustrating calculation of a gradient difference according to implementations.

In combination with FIG. 6, the left side in FIG. 6 includes the block to be matched S0, which includes pixel points arranged in an array of n*n (in an array of 4*4 in FIG. 6). S0(i,j) represents a pixel point in the $i^{th}$ column and $j^{th}$ row in the block to be matched S0. Each dotted box in the left side in FIG. 6 represents adjacent external pixel points of the block to be matched S0. In the right side in FIG. 6 the reference block S1 and adjacent external pixel points of the reference block S1 are illustrated. The gradient of the block to be matched S0 is calculated as follows:

$$Grad(S0) = \sum_{i=1}^{n} |H1(i) - S0(i, 1)| + \sum_{i=1}^{n} |H2(i) - S0(i, n)| + \sum_{j=1}^{n} |V1(j) - S0(i, j)| + \sum_{j=1}^{n} |V2(j) - S0(n, j)|. \quad (1)$$

Similarly, the gradient of the reference block S1 is calculated as follows:

$$Grad(S1) = \sum_{i=1}^{n} |h1(i) - S1(i, 1)| + \sum_{i=1}^{n} |h2(i) - S1(i, n)| + \sum_{j=1}^{n} |v1(j) - S1(i, j)| + \sum_{j=1}^{n} |v2(j) - S1(n, j)|. \quad (2)$$

Therefore, the gradient difference between the block to be matched S0 and the reference block S1 is calculated as follows:

$$Grad\_Diff = |Grad(S0) - Grad(S1)| \quad (3).$$

About penalty value: the penalty value is used for describing reliability of matching between the block to be matched and the reference block, which is obtained according to experience and experiments. The disclosure is not limited thereto. For example, the block to be matched and the reference block can be inputted to a pre-trained neural network, where the block to be matched is inputted to a first channel and the reference block is inputted to a second channel, such that a matching degree can be outputted by the neural network. Generally, the lower the matching degree, the higher the penalty value, for example, penalty value=1−matching degree.

About Euclidean distance: image features are respectively extracted from the block to be matched and the reference block to obtain two feature vectors, and a Euclidean distance between the two feature vectors is calculated.

In addition, other error terms can also be determined, such as a cross-correlation degree calculated based on a cross-correlation function, a mean-square error, the number of matched pixel points or a proportion of matched pixel points obtained based on the maximum pixel matching statistics, and so on.

In at least one implementation, if the error is determined according to at least two error terms, the error between the block to be matched and the reference block is determined by performing weighted calculation on the at least two error terms. For example, if the SAD, the gradient difference, the penalty value, and the Euclidean distance are all adopted to calculated the error, the error can be calculated according to following formula (4):

$$\text{Loss}=w_1\text{SAD}+w_2\text{Grad\_Diff}+w_3\text{Penalty}+w_4\text{Dis} \quad (4),$$

where Loss represents the error, Dis represents the Euclidean distance, and w1, w2, w3, and w4 are all preset weights, which can be set according to experience or actual needs. In addition, since w1, w2, w3, and w4 can play a role of normalization, the sum of w1, w2, w3, and w4 is not necessarily equal to 1. According to the formula (4), the error between the block to be matched and each reference block is calculated.

At block 320, at least one candidate block is determined from the reference blocks according to the multiple errors.

In at least one implementation, the reference blocks can be sorted in an ascending order of the multiple errors. A previous reference block matches the block to be matched better than a next reference block. The at least one candidate block can be sequentially selected starting from the first reference block among the reference blocks arranged in the ascending order of the multiple errors. For example, any number of reference blocks can be selected as candidate blocks according to actual needs. The candidate block is a better block (that is, a block that matches the block to be matched better) in the reference blocks, but the candidate block is not necessarily the optimal block.

During sorting of the reference blocks, if an error between the block to be matched and any one of at least two reference blocks is the same as that between the block to be matched and another of the at least two reference blocks, an arrangement order of the at least two reference blocks among the reference blocks is determined according to a preset error term. The preset error term includes any one of the following error terms or a combination of two or three of the following error terms: the SAD, the gradient difference, the penalty value, or the Euclidean distance. In other words, another error (i.e., sub-error described below) needs to be further calculated according to the preset error term and the sub-error can be regarded as a subset of the error. For example, if the error is determined according to all the SAD, the gradient difference, the penalty value, and the Euclidean distance, a sub-error can be determined according to any one of the above error terms or a combination of two or three of the above error terms, which is determined according to actual needs. For example, when the error is calculated according to the formula (4), if the Loss between the reference block S1 and the block to be matched S0 is the same as that between the reference block S2 and the block to be matched S0, to further determine which reference block in the reference block S1 and the reference block S2 matches the block to be matched S0 better, a sub-error between the reference block S1 and the block to be matched S0 and a sub-error between the reference block S2 and the block to be matched S0 can be further calculated, where the sub-error is obtained according to the preset error term. For example, if the preset error term is the SAD and the gradient difference, sub-error Loss1 can be calculated according to the following formula (5):

$$\text{Loss1}=w_1\text{SAD}+w_2\text{Grad\_Diff} \quad (5).$$

That is, if Loss1 between the reference block S1 and the block to be matched S0 is less than that between the reference block S2 and the block to be matched S0, it indicates that the reference block S1 matches the block to be matched S0 better, and thus the reference block S1 is sorted in the front of the reference block S2; otherwise, it indicates that the reference block S2 matches the block to be matched S0 better, and thus the reference block S2 is sorted in the front of the reference block S1.

In addition, preset error items in multiple levels can be determined. For example, if Loss corresponding to one of two reference blocks is the same as that corresponding to the other of the two reference blocks, compare Loss1 corresponding to one reference block and Loss1 corresponding to the other reference block; if Loss1 corresponding to the one reference block is the same as that corresponding to the other reference block, proceed to compare Grad_Diff corresponding to one reference block and Grad_Diff corresponding to the other reference block, and if Grad_Diff corresponding to the one reference block is the same as that corresponding to the other reference block, proceed to compare Penalty values corresponding to the two reference blocks, and so on, until the better one of the two reference blocks is determined.

Figure 7:
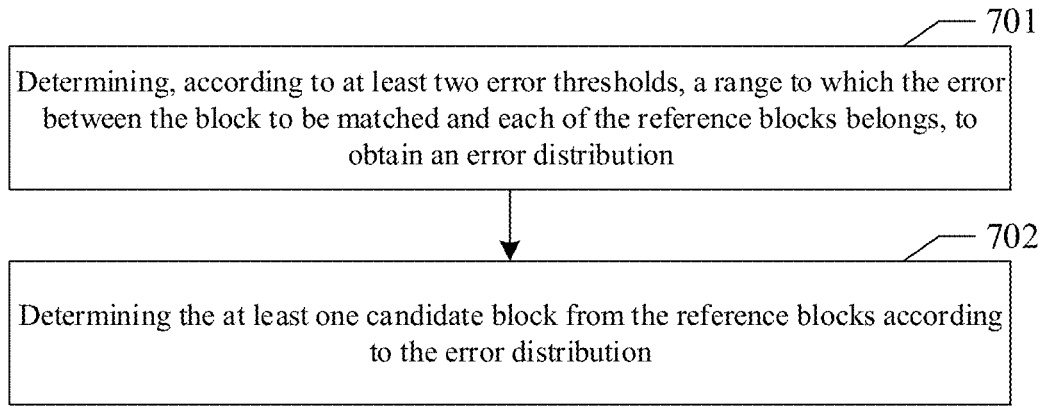
FIG. 7 is a flow chart illustrating determining of candidate blocks according to implementations.

In at least one implementation, as illustrated in FIG. 7, operations at block 320 include operations at block 701 to block 702.

At block 701, a range to which the error between the block to be matched and each of the reference blocks belongs is determined according to at least two error thresholds, to obtain an error distribution, where the at least two error thresholds are different from each other and obtained according to experience or experiments, and the error distribution is associated with determining of the at least one candidate block.

At block 702, the at least one candidate block is determined from the reference blocks according to the error distribution.

For example, a first error threshold T1 and a second error threshold T2 can be set, where T1<T2, such that three numerical ranges $(-\infty, T1)$, $[T1, T2]$, and $(T2, +\infty)$ can be obtained, and then a distribution of all errors in three numerical ranges is determined. For each reference block, a type of the reference block is determined. For example, if an error corresponding to a reference block is within $(-\infty, T1)$, the reference block is determined as a first-type reference block, which is regarded as a better reference block. Alternatively, if the error corresponding to the reference block is within $[T1, T2]$, the reference block is determined as a second-type reference block, which is regarded as a suboptimal reference block. Alternatively, if the error corresponding to the reference block is within $(T2, +\infty)$, the reference block is determined as a third-type reference block, which is regarded as an average reference block. In this way, the type of each reference block is determined, and the error distribution can be determined according to the type of each reference block as illustrated below. In a case that there are three reference blocks, after errors corresponding to the three reference blocks are calculated respectively, various distributions obtained by determining a numerical range to which the error corresponding to each reference block belongs is illustrated in Table 1. Table 1 illustrates some distributions of the three reference blocks. For example, when the number of the first-type reference blocks is 2, no matter how many the remaining two types of reference blocks there are, the three reference blocks are considered to belong to Distribution 2. For another example, when the number of the first-type reference blocks is 1, no matter how many the remaining two types of reference blocks there are, the three reference blocks are considered to belong to Distribution 3.

TABLE 1

| Number | (−∞, T1) | [T1, T2] | (T2, +∞) | Candidate blocks |
|---|---|---|---|---|
| Distribution 1 | 3 | 0 | 0 | Two first-type reference blocks corresponding to smaller errors |
| Distribution 2 | 2 | 0 | 1 | The first-type reference blocks |
| Distribution 3 | 1 | 1 | 1 | The first-type reference blocks |
| Distribution 4 | 0 | 3 | 0 | Two second-type reference blocks corresponding to smaller errors |
| Distribution 5 | 0 | 2 | 1 | The second-type reference blocks |
| Distribution 6 | 0 | 1 | 2 | The second-type reference blocks |
| Distribution 7 | 0 | 0 | 3 | Two third-type reference blocks corresponding to smaller errors |

Figure 8:
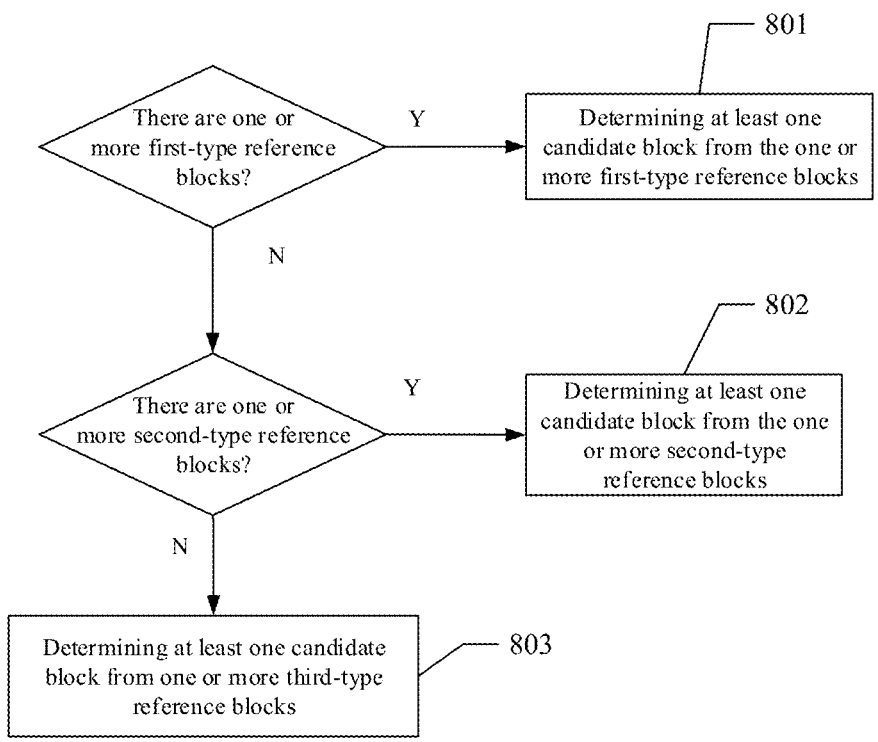
FIG. 8 is a flow chart illustrating determining of candidate blocks according to other implementations.

After the error distribution is obtained, the at least one candidate block can be determined. The at least one candidate block can be determined as follows. If one or more better reference blocks are determined, the at least one candidate block is determined from the one or more better reference block. If there is no better reference block, the at least one candidate block is determined from one or more suboptimal reference blocks. Alternatively, if there is no suboptimal reference block, the at least one candidate block is determined from one or more average reference blocks. In at least one implementation, as illustrated in FIG. 8, the at least one candidate block can be determined through operations at block 801 to block 803.

At block 801, if one or more first-type reference blocks are determined, the at least one candidate block is determined from the one or more first-type reference blocks.

At block 802, if there is no first-type reference block and one or more second-type reference blocks are determined, the at least one candidate block is determined from the one or more second-type reference blocks.

At block 803, if there are no first-type reference block and no second-type reference block, the at least one candidate block is determined from at least one third-type reference block, where the at least one candidate block may be a third-type reference block(s) in a first preset direction of the block to be matched.

The first preset direction may be a direction predetermined according to actual scenarios. For example, motion vectors corresponding to several previous frames are used to predict a motion direction of the current block, which is then determined as the first preset direction. As illustrated in FIG. 4, in case that an upper left direction and an upper right direction are both taken as the first preset direction, if the reference blocks S1 to S8 are all the third-type reference blocks, reference blocks S1 and S3 are determined as the at least one candidate block.

Alternatively, as illustrated in Table 1, in case that there are three reference blocks, the at least one candidate block can be determined as follows.

If one or more first-type reference blocks are determined, the at least one candidate block is determined from the one or more first-type reference blocks. In one example, if the number of the first-type reference blocks is larger than 2, two first-type reference blocks corresponding to smaller errors are determined as the candidate blocks. For example, in a scene that there are three first-type reference blocks, if an error between one first-type reference block and the block to be matched is larger than that between any one of the remaining two first-type reference blocks and the block to be matched, the one first-type reference block is not determined as one candidate block, and the remaining two first-type reference blocks are determined as the candidate blocks.

If there is no first-type reference block and one or more second-type reference blocks are determined, the at least one candidate block is determined from the one or more second-type reference blocks. In one example, if the number of the second-type reference blocks is larger than 2, two second-type reference blocks corresponding to smaller errors are determined as the candidate blocks. For example, in a scene that there are three second-type reference blocks, if an error between one second-type reference block and the block to be matched is larger than that between any one of the remaining two second-type reference blocks and the block to be matched, the one second-type reference block is not determined as one candidate block, and the remaining two second-type reference blocks are determined as the candidate blocks.

If there are no first-type reference block and no second-type reference block, the at least one candidate block is determined from one or more third-type reference blocks. For example, as illustrated in Table 1, two third-type reference blocks corresponding to smaller errors are determined from three third-type reference blocks as the candidate blocks.

Therefore, no more than two candidate blocks are selected, which makes the matching degree of the candidate blocks be relatively high.

During performing the operations at block 701, the reference blocks can be sorted in an ascending order of the multiple errors, and a preset number of reference blocks are selected starting from a first reference block among the reference blocks. According to the at least two error thresholds, the range to which the error between the block to be matched and each of the preset number of reference blocks selected belongs to obtain the error distribution. The preset number is generally smaller than the total number of the reference blocks and can be set according to actual needs. For example, if the total number of the reference blocks is eight, the preset number is three, that is, three reference blocks corresponding to smaller errors are selected. Thereafter, determine the range to which the error between the block to be matched and each of the three reference blocks belongs, to obtain error distribution, and at least one candidate block is determined from the three reference blocks according to the error distribution. As such, the calculation can be simplified and the efficiency can be improved.

At block 330, a random number range is determined according to a displacement between the block to be matched and each of the reference blocks.

In one example, a magnitude of a motion vector between the block to be matched and each reference block can be determined as the displacement between the block to be matched and the reference block, which reflects a motion speed of the target object in the video. A large displacement indicates that the target object moves fast, and thus a relatively large random number range can be determined.

Figure 9:
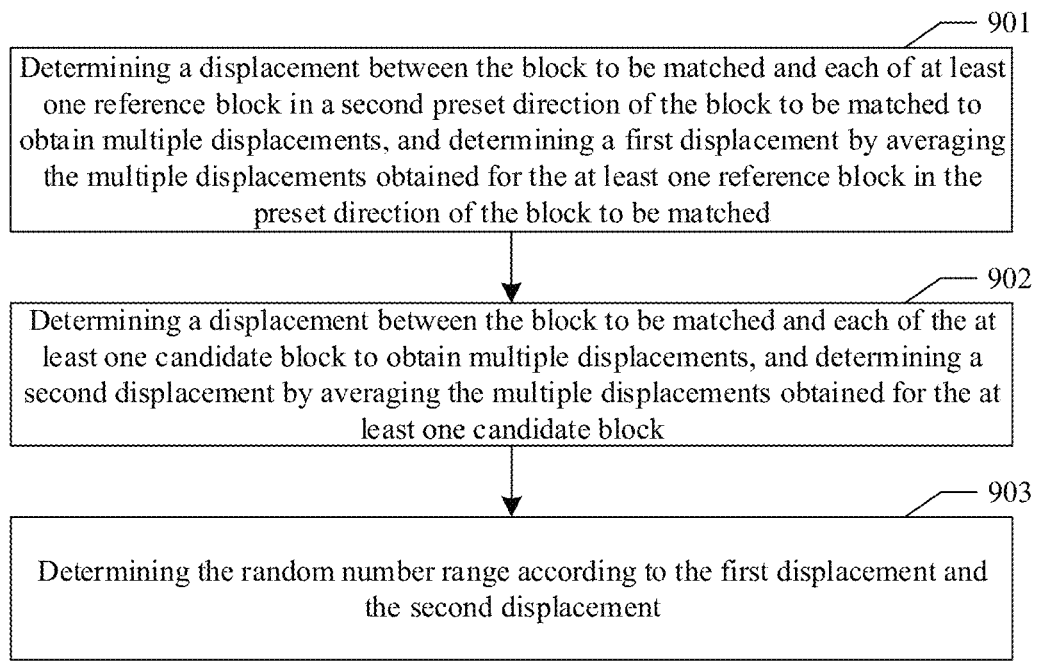
FIG. 9 is a flow chart illustrating determining of a random number range according to implementations.

In at least one implementation, as illustrated in FIG. 9, the operations at block 330 include operations at block 901 and block 903.

At block 901, a displacement between the block to be matched and each of at least one reference block in a second preset direction of the block to be matched is determined to obtain multiple displacements, and a first displacement is determined by averaging the multiple displacements obtained for the at least one reference block in the preset direction of the block to be matched.

At block 902, a displacement between the block to be matched and each of the at least one candidate block is determined to obtain multiple displacements, and a second displacement is determined by averaging the multiple displacements obtained for the at least one candidate block.

At block 903, the random number range is determined according to the first displacement and the second displacement.

The second preset direction may be a direction that is determined in advance according to actual scenarios. For example, motion directions of current blocks in all previous frames are determined as the second preset direction. The second preset direction has no relation to the first preset direction, that is, the second preset direction and the first preset direction can be same or different.

For example, as illustrated in FIG. 4, if a left direction, an upper left direction, an up direction, and an upper right direction are taken as the second preset direction, the at least one reference block in the second preset direction of the block to be matched S0 includes reference blocks S1, S2, S3, and S4, and then displacements between the block to be matched S0 and the reference blocks S1, S2, S3, and S4 are calculated respectively, such that first displacement R1 is obtained by averaging the displacements between the block to be matched S0 and the reference blocks S1, S2, S3, and S4. Thereafter, the displacement between the block to be matched and each of the at least one candidate block is calculated. Consider that the at least one candidate block in FIG. 4 includes candidate blocks S6 and S7, displacements between the block to be matched S0 and the candidate blocks S6 and S7 are calculated respectively, and thus second displacement R2 is obtained by averaging the displacements between the block to be matched S0 and the candidate blocks S6 and S7. The random number range is determined according to the first displacement and the second displacement. For example, an average displacement (R0=(R1+R2)/2) of the first displacement and the second displacement is calculated, and the average displacement is converted according to a preset conversion relationship to obtain the random number range. As one example, consider that there are two preset thresholds, which are expressed as a third preset threshold T3 and a fourth preset threshold T4 (T3<T4), if R0<T3, it is determined as a small motion scenario (that is, it indicates that the target object in the video moves slowly), and thus a relatively small random number range is determined, such as [−3, 3]; or if T3<R0<T4, it is determined as a middle motion scenario (that is, it indicates that the target object in the video moves relatively slowly, i.e., moves at a speed higher than a speed the target object in the small motion scenario moves), and thus a middle random number range is determined, such as [−5, 5]. Alternatively, if R0>T4, it is determined as a large motion scenario (that is, it indicates that the target object in the video moves fast, i.e., moves at a speed higher than a speed the target object in the middle motion scenario moves), and thus a relatively large random number range is determined, such as [−9, 9]. As another example, a conversion coefficient $\alpha$ ($\alpha$>0) can be set, and after average displacement R0 is obtained, the random number range can be set to be [−$\alpha$R0, $\alpha$R0].

It should be noted that the above calculation process is illustrative. Alternatively, first displacement R1 and second displacement R2 can also be weighted to obtain average displacement R0, or determine that there is a non-linear conversion relationship between average displacement R0 and the random number range. The disclosure is not limited thereto.

As can be seen, the random number range corresponds to the displacement, which can achieve an adaptive effect of the random number range. Different scenarios and different target motion states (speeds) correspond to different random number ranges, which can improve the robustness of the solutions.

At block 340, random motion vectors are obtained by using a motion vector between the block to be matched and each of the at least one candidate block as a basic motion vector and random numbers within the random number range as increments.

In at least one implementation, when the at least one candidate block is embodied as multiple candidate blocks, a motion vector between the block to be matched and each of the multiple candidate blocks is calculated to obtain multiple motion vectors, and the multiple motion vectors are averaged to obtain the basic motion vector. During averaging of the multiple motion vectors, arithmetic average of the multiple motion vectors can be calculated, or a corresponding weight can be calculated according to the error between each candidate block and the block to be matched, and the weighted average can be performed on the multiple motion vectors to obtain the basic motion vector.

Figure 10:
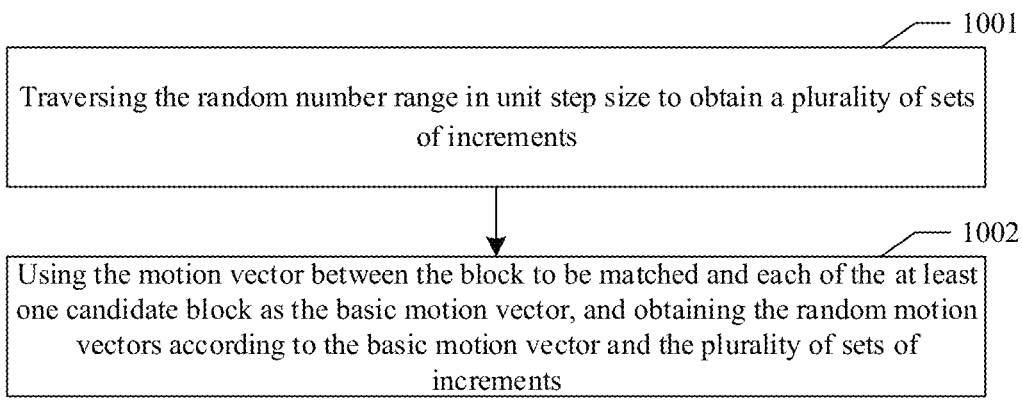
FIG. 10 is a flow chart illustrating obtaining of random motion vectors according to implementations.

The basic motion vector includes two components in x and y directions (x component and y component) (i.e., two coordinate dimensions in an image plane). During adding increments to the basic motion vector, two random numbers can be generated within the random number range and are respectively added to the x component and the y component of the basic motion vector, so as to obtain a random motion vector. In at least one implementation, as illustrated in FIG. 10, operations at block 340 include operations at block 1001 and block 1002.

At block 1001, the random number range is traversed in unit step size to obtain multiple sets of increments.

At block 1002, the motion vector between the block to be matched and each of the at least one candidate block is used as the basic motion vector, and the random motion vectors are obtained according to the basic motion vector and the multiple sets of increments.

The unit step size can be one pixel size. In case that the random number range is [−3,3], if the unit step size is 1, after the random number range is traversed, 25 sets of increments (including (0,0)) can be obtained. Thereafter, each set of increments is added to the basic motion vector to obtain 25 random motion vectors, thereby forming a random motion vector set.

At block 350, an optimal motion vector corresponding to the block to be matched is determined according to the random motion vectors.

After the random motion vectors are determined, an error between the block to be matched and a reference block corresponding to each of the random motion vectors is calculated, and then a random motion vector corresponding to a minimum error is determined as the optimal motion vector, such that the motion estimation of the block to be matched is completed.

Figure 11:
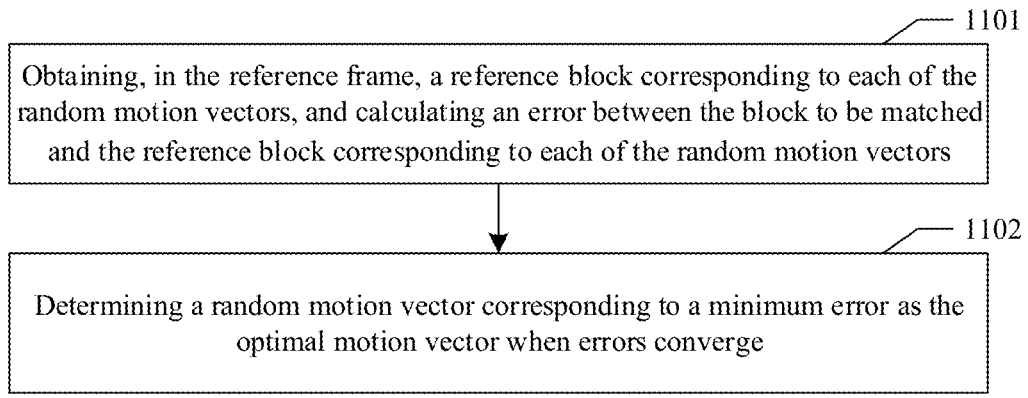
FIG. 11 is a flow chart illustrating determining of an optimal motion vector according to implementations.

In at least one implementation, according to the multiple random motion vectors obtained in FIG. 10, as illustrated in FIG. 11, the operations at block 350 include operations at block 1101 and block 1102.

At block 1101, in the reference frame, a reference block corresponding to each of the random motion vectors is obtained, and an error between the block to be matched and the reference block corresponding to each of the random motion vectors is calculated.

At block 1102, a random motion vector corresponding to a minimum error is determined as the optimal motion vector when errors converge.

The reference blocks obtained in operations at block 1101 are different from that in operations at block 310. The block to be matched is moved according to the random motion vectors, and in the reference frame an image block that locates at a position of the block to-be-matched after being moved is determined as the reference block. During traversing of the random number range, each time a set of increments is obtained, a corresponding random motion vector is calculated, and an error between a reference block corresponding to the random motion vector and the block to be matched is calculated. In addition, during traversing of the random number range, if the errors converge, for example, if errors corresponding to a certain number of continuous random motion vectors are no longer reduced, the random motion vector corresponding to the minimum error is determined as the optimal motion vector.

Alternatively, it is also possible to calculate an error between each random motion vector obtained in operation at block 1002 and the block to be matched, and then select a random motion vector corresponding to a minimum error as the optimal motion vector. By traversing the random number range, local convergence can be improved, thereby ensuring that the optimal motion vector finally obtained is global optimal.

In the method for motion estimation, the error between the block to be matched and each of the reference blocks is determined to determine the at least one candidate block. The random number range is determined according to the displacement between the block to be matched and each of the reference blocks. The random motion vectors are obtained by using the motion vector between the block to be matched and each of the at least one candidate block as the basic motion vector and the random numbers within the random number range as increments. The optimal motion vector corresponding to the block to be matched is determined according to the random motion vectors. On one hand, the random number range is determined according to displacements, and thus the adaptability of the random number range for different scenarios is improved and the random number range can be applied to different scenarios to obtain robust random numbers and random motion vectors. Therefore, an optimal block can be obtained, thereby improving the accuracy of motion estimation. On the other hand, the at least one candidate block is selected from the reference blocks and the basic motion vector between the block to be matched and each of the at least one candidate block is further determined, which improves the pertinence of the basic motion vector, such that the optimal block can be quickly determined according to the basic motion vector and the random numbers. That is, there is no need to repeatedly search in multiple directions, so as to reduce the amount of calculation and improve the efficiency.

Figure 12:
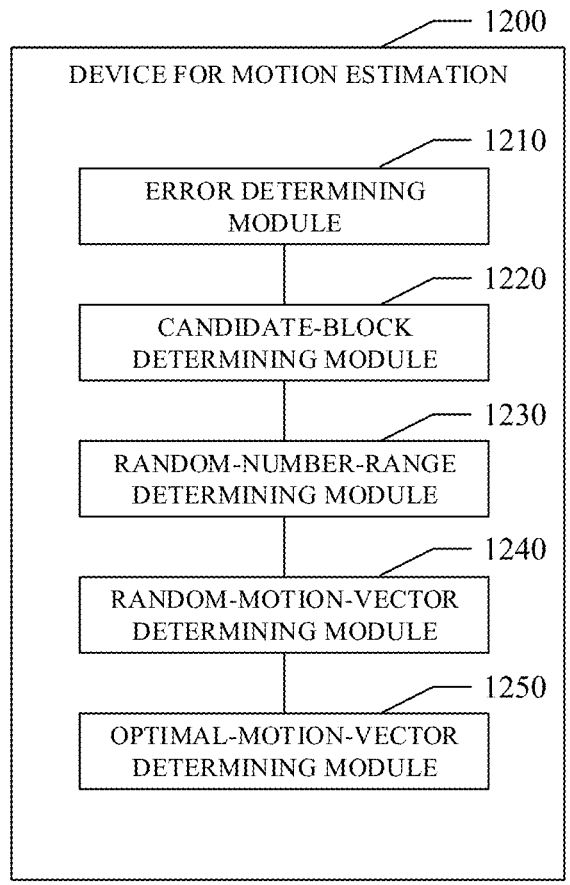
FIG. 12 is a schematic structural diagram illustrating a device for motion estimation according to implementations.

FIG. 12 is a schematic structural diagram illustrating a device for motion estimation according to implementations. As illustrated in FIG. 12, a device 1200 for motion estimation includes an error determining module 1210, a candidate-block determining module 1220, a random-number-range determining module 1230, a random-motion-vector determining module 1240, and an optimal-motion-vector determining module 1250.

The error determining module 1210 is configured to determine an error between a block to be matched and each of reference blocks to obtain multiple errors, where the block to be matched is an image block in a current frame and the reference blocks are image blocks in a reference frame corresponding to the current frame. The candidate-block determining module 1220 is configured to determine at least one candidate block from the reference blocks according to the multiple errors. The random-number-range determining module 1230 is configured to determine a random number range according to a displacement between the block to be matched and each of the reference blocks. The random-motion-vector determining module 1240 is configured to obtain random motion vectors by using a motion vector between the block to be matched and each of the at least one candidate block as a basic motion vector and random numbers within the random number range as increments. The optimal-motion-vector determining module 1250 is configured to determine an optimal motion vector corresponding to the block to be matched according to the random motion vectors.

In at least one implementation, the error between the block to be matched and any one of the reference blocks is determined according to one or more of following error terms: a SAD, a gradient difference, a penalty value, or a Euclidean distance.

In at least one implementation, the gradient difference between the block to be matched and each of the reference blocks is determined as follows. For each of edge pixel points of the block to be matched in the current frame, a gradient between the edge pixel point and a corresponding adjacent external pixel point is calculated; gradients calculated for the edge pixel points of the block to be matched are summed to obtain a gradient of the block to be matched. For each of edge pixel points of the reference block in the reference frame, a gradient between the edge pixel point and a corresponding adjacent external pixel point is calculated; gradients calculated for the edge pixel points of the reference block are summed to obtain a gradient of the reference block. The gradient difference between the block to be matched and the reference block is obtained by calculating an absolute value of a difference between the gradient of the block to be matched and the gradient of the reference block.

In at least one implementation, the error determining module 1210 is further configured to obtain the error between the block to be matched and any one of the reference blocks by performing weighted calculation on at least two error terms, when the error is determined according to the at least two error terms.

In at least one implementation, the candidate-block determining module 1220 is configured to: sort the reference blocks in an ascending order of the multiple errors, and select the at least one candidate block starting from a first reference block among the reference blocks. The candidate-block determining module 1220 configured to sort the reference blocks in the ascending order of the multiple errors is configured to determine, according to a preset error term, an arrangement order of at least two reference blocks among the reference blocks, if an error between the block to be matched and any one of the at least two reference blocks is the same as that between the block to be matched and another of the at least two reference blocks. The preset error term includes any one of the following error terms or a combination of two or three of the following error terms: the SAD, the gradient difference, the penalty value, or the Euclidean distance.

In at least one implementation, the candidate-block determining module 1220 is configured to: determine, according to at least two error thresholds, a range to which the error between the block to be matched and each of the reference blocks belongs, to obtain an error distribution, where the error distribution is associated with determining of the at least one candidate block, and determine the at least one candidate block from the reference blocks according to the error distribution.

In at least one implementation, the candidate-block determining module 1220 is configured to: determine, for each of the reference blocks, a type of the reference block according to the at least two error thresholds, and obtain the error distribution according to determination of the type of each of the reference blocks. The at least two error thresholds include a first error threshold and a second error threshold greater than the first error threshold, and the candidate-block determining module 1220 configured to determine the type of the reference block according to the at least two error thresholds is configured to: determine the reference block as a first-type reference block when an error corresponding to the reference block is lower than the first error threshold; determine the reference block as a second-type reference block when the error corresponding to the reference block is between the first error threshold and the second error threshold; or determine the reference block as a third-type reference block when the error corresponding to the reference block is higher than the second error threshold.

In at least one implementation, the candidate-block determining module 1220 is configured to: if at least one first-type reference block is determined, determine the at least one candidate block from the at least one first-type reference block; or if no first-type reference block is determined and at least one second-type reference block is determined, determine the at least one candidate block from the at least one second-type reference block.

In at least one implementation, the candidate-block determining module 1220 is further configured to: if no first-type reference block and no second-type reference block are determined, determine the at least one candidate block from at least one third-type reference block, where the at least one candidate block may be a third-type reference block(s) in a first preset direction of the block to be matched.

In at least one implementation, the candidate-block determining module 1220 is further configured to: sort the reference blocks in an ascending order of the multiple errors, and select a preset number of reference blocks starting from a first reference block among the reference blocks, and determine, according to the at least two error thresholds, the range to which the error between the block to be matched and each of the preset number of reference blocks belongs to obtain the error distribution.

In at least one implementation, the random-number-range determining module 1230 is configured to: determine a displacement between the block to be matched and each of at least one reference block in a second preset direction of the block to be matched to obtain multiple displacements and determine a first displacement by averaging the multiple displacements obtained for the at least one reference block in the preset direction of the block to be matched; determine a displacement between the block to be matched and each of the at least one candidate block to obtain multiple displacements, and determine a second displacement by averaging the multiple displacements obtained for the at least one candidate block; determine the random number range according to the first displacement and the second displacement.

In at least one implementation, the random-number-range determining module 1230 is configured to: calculate an average displacement of the first displacement and the second displacement, and convert the average displacement according to a preset conversion relationship to obtain the random number range.

In at least one implementation, the random-motion-vector determining module 1240 is configured to: calculate, when the at least one candidate block is embodied as multiple candidate blocks, a motion vector between the block to be matched and each of the multiple candidate blocks to obtain multiple motion vectors, and average the multiple motion vectors to obtain the basic motion vector.

In at least one implementation, the random-motion-vector determining module 1240 is configured to: traverse the random number range in unit step size to obtain multiple sets of increments; use the motion vector between the block to be matched and each of the at least one candidate block as the basic motion vector, and obtain the random motion vectors according to the basic motion vector and the multiple sets of increments.

In at least one implementation, the optimal-motion-vector determining module 1250 is configured to: obtain, for the reference frame, a reference block corresponding to each of the random motion vectors, and calculate an error between the block to be matched and the reference block corresponding to each of the random motion vectors; determine a random motion vector corresponding to a minimum error as the optimal motion vector when errors converge.

For specific details of each module in the above device that are not described, reference can be made to the corresponding processes of the above method implementations, which will not be repeated herein.

Those skilled in the art can understand that various aspects of the disclosure can be implemented as systems, methods, or program products. Therefore, various aspects of the disclosure can be implemented in the following forms: a complete hardware implementation, a complete software implementation (including firmware, microcode, etc.), or a combination of hardware and software, which can be collectively referred to herein as "circuit", "module" or "system".

Exemplary implementations of the disclosure further provide a computer-readable storage medium on which is stored a program product capable of implementing the above-mentioned method of the specification. In some possible implementations, various aspects of the disclosure can also be implemented in the form of a program product, which includes a program code. When the program product runs on a terminal device, the program code causes the terminal device to execute the above-mentioned steps described in the exemplary methods according to various exemplary implementations of the disclosure, for example, the program code causes the terminal device to execute any one or more steps illustrated in FIG. 3 or FIG. 5.

The program product can use a portable compact disk read-only memory (CD-ROM) and include program codes, which can run on a terminal device, such as a personal computer. However, the program product of the disclosure is not limited thereto. The readable storage medium provided herein can be any tangible medium that contains or stores a program, and the program can be used by or in combination with an instruction execution system/apparatus/device.

The program product may include at least one readable medium. The readable medium may be a readable signal medium or a readable storage medium. The readable storage medium may be, for example, but is not limited to, an electrical, magnetic, optical, electromagnetic, infrared, or semiconductor system/apparatus/device, or any combination of the above. More specific examples (non-exhaustive list) of the readable storage medium include: electrical connection with one or more wires, a portable disk, a hard disk, a random access memory (RAM), a read only memory (ROM), an erasable programmable ROM (EPROM or flash memory), an optical fiber, a portable compact disk ROM (CD-ROM), an optical storage device, a magnetic storage device, or any combination of the above.

The computer-readable signal medium may include a data signal propagated in baseband or as a part of a carrier wave, on which readable program codes are carried. The propagated data signal can take many forms, including but not limited to electromagnetic signals, optical signals, or any combination of the above. The readable signal medium may also be any readable medium other than the readable storage medium, and the readable medium may send, propagate, or transmit a program which is used by or in combination with the instruction execution system/apparatus/device.

The program code included in the readable medium can be transmitted through any suitable medium, including but not limited to wireless, wired, optical cable, radio frequency (RF), etc., or any combination of the above.

The program codes used to perform the operations of the disclosure can be written in any combination of one or more programming languages. The programming languages include object-oriented programming languages—such as java, C++, etc., as well as conventional procedural programming language-such as "C" language or similar programming language. The program codes can be entirely executed on the user's computing device, partly executed on the user's device, executed as an independent software package, partly executed on the user's computing device and partly executed on the remote computing device, or entirely executed on a remote computing device or a server. In the case of the remote computing device, the remote computing device can be coupled to a user's computing device through any kind of network, including a local area network (LAN) or a wide area network (WAN), or can be coupled to an external computing device (for example, via the Internet provided by an Internet service provider).

Other implementations of the disclosure can be easily obtained after considering the description and practicing the solutions disclosed herein. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the implementations are merely exemplary, and the scope and spirit of the disclosure are pointed out by the claims.

It should be understood that the disclosure is not limited to the precise structure that has been described above and illustrated in the drawings, and various modifications and changes can be made without departing from its scope. The scope of the disclosure is only limited by the appended claims.

What is claimed is:

1. A method for motion estimation, comprising:
   determining an error between a block to be matched and each of reference blocks to obtain a plurality of errors, wherein the block to be matched is an image block in a current frame, and the reference blocks are image blocks in a reference frame corresponding to the current frame;
   determining at least one candidate block from the reference blocks according to the plurality of errors;
   determining a random number range according to a displacement between the block to be matched and each of the reference blocks;
   obtaining random motion vectors by using a motion vector between the block to be matched and each of the at least one candidate block as a basic motion vector and random numbers within the random number range as increments; and
   determining a target motion vector corresponding to the block to be matched according to the random motion vectors.

2. The method of claim 1, wherein the error between the block to be matched and any one of the reference blocks is determined according to one or more of following error terms: a sum of absolute differences (SAD), a gradient difference, a penalty value, or a Euclidean distance.

3. The method of claim 2, wherein determining the gradient difference between the block to be matched and each of the reference blocks comprises:
   calculating, for each of edge pixel points of the block to be matched in the current frame, a gradient between the edge pixel point and a corresponding adjacent external pixel point, and summing gradients calculated for the edge pixel points of the block to be matched to obtain a gradient of the block to be matched;
   calculating, for each of edge pixel points of the reference block in the reference frame, a gradient between the edge pixel point and a corresponding adjacent external pixel point, and summing gradients calculated for the edge pixel points of the reference block to obtain a gradient of the reference block; and
   obtaining the gradient difference between the block to be matched and the reference block by calculating an absolute value of a difference between the gradient of the block to be matched and the gradient of the reference block.

4. The method of claim 2, further comprising:
   on condition that the error is determined according to at least two error terms, determining the error between the block to be matched and any one of the reference blocks by performing weighted calculation on the at least two error terms.

5. The method of claim 2, wherein determining the at least one candidate block from the reference blocks according to the plurality of errors comprises:
   sorting the reference blocks in an ascending order of the plurality of errors; and
   selecting the at least one candidate block starting from a first reference block among the reference blocks.

6. The method of claim 5, wherein sorting the reference blocks in the ascending order of the plurality of errors comprises:
   determining, according to a preset error term, an arrangement order of at least two reference blocks among the reference blocks, on condition that an error between the block to be matched and any one of the at least two reference blocks is the same as that between the block to be matched and another of the at least two reference blocks;

wherein the preset error term comprises any one of the following error terms or a combination of two or three of the following error terms: the SAD, the gradient difference, the penalty value, or the Euclidean distance.

7. The method of claim 1, wherein determining the at least one candidate block from the reference blocks according to the plurality of errors comprises:

determining, according to at least two error thresholds, a range to which the error between the block to be matched and each of the reference blocks belongs, to obtain an error distribution, wherein the error distribution is associated with determining of the at least one candidate block; and determining the at least one candidate block from the reference blocks according to the error distribution.

8. The method of claim 7, wherein determining, according to the at least two error thresholds, the range to which the error between the block to be matched and each of the reference blocks belongs, to obtain the error distribution comprises:

for each of the reference blocks, determining a type of the reference block according to the at least two error thresholds; and obtaining the error distribution according to the type of each of the reference blocks;

wherein the at least two error thresholds comprise a first error threshold and a second error threshold greater than the first error threshold, and determining the type of each of the reference blocks according to the at least two error thresholds comprises:

determining the reference block as a first-type reference block on condition that an error corresponding to the reference block is lower than the first error threshold;

determining the reference block as a second-type reference block on condition that the error corresponding to the reference block is between the first error threshold and the second error threshold; or determining the reference block as a third-type reference block on condition that the error corresponding to the reference block is higher than the second error threshold.

9. The method of claim 8, wherein determining the at least one candidate block from the reference blocks according to the error distribution comprises one of:

on condition that at least one first-type reference block is determined, determining the at least one candidate block from the at least one first-type reference block; or on condition that no first-type reference block is determined and at least one second-type reference block is determined, determining the at least one candidate block from the at least one second-type reference block.

10. The method of claim 9, wherein determining the at least one candidate block from the reference blocks according to the error distribution further comprises:

on condition that no first-type reference block and no second-type reference block are determined, determining the at least one candidate block from at least one third-type reference block.

11. The method of claim 7, wherein determining, according to the at least two error thresholds, the range to which the error between the block to be matched and each of the reference blocks belongs, to obtain the error distribution comprises:

sorting the reference blocks in an ascending order of the plurality of errors, and selecting a preset number of reference blocks starting from a first reference block among the reference blocks; and determining, according to the at least two error thresholds, the range to which the error between the block to be matched and each of the preset number of reference blocks belongs to obtain the error distribution.

12. The method of claim 1, wherein determining the random number range according to the displacement between the block to be matched and each of the reference blocks comprises:

determining a displacement between the block to be matched and each of at least one reference block in a preset direction of the block to be matched to obtain a plurality of displacements, and determining a first displacement by averaging the plurality of displacements obtained for the at least one reference block in the preset direction of the block to be matched;

determining a displacement between the block to be matched and each of the at least one candidate block to obtain a plurality of displacements, and determining a second displacement by averaging the plurality of displacements obtained for the at least one candidate block; and determining the random number range according to the first displacement and the second displacement.

13. The method of claim 12, wherein determining the random number range according to the first displacement and the second displacement comprises:

calculating an average displacement of the first displacement and the second displacement; and converting the average displacement to obtain the random number range.

14. The method of claim 1, wherein using the motion vector between the block to be matched and each of the at least one candidate block as the basic motion vector comprises:

calculating, on condition that the at least one candidate block is embodied as a plurality of candidate blocks, a motion vector between the block to be matched and each of the plurality of candidate blocks to obtain a plurality of motion vectors; and averaging the plurality of motion vectors to obtain the basic motion vector.

15. The method of claim 1, wherein obtaining the random motion vectors by using the motion vector between the block to be matched and each of the at least one candidate block as the basic motion vector and the random numbers within the random number range as the increments comprises:

traversing the random number range in unit step size to obtain a plurality of sets of increments; and using the motion vector between the block to be matched and each of the at least one candidate block as the basic motion vector, and obtaining the random motion vectors according to the basic motion vector and the plurality of sets of increments.

16. The method of claim 15, wherein determining the target motion vector corresponding to the block to be matched according to the random motion vectors comprises:

obtaining, in the reference frame, a reference block corresponding to each of the random motion vectors, and calculating an error between the block to be matched and the reference block corresponding to each of the random motion vectors; and determining a random motion vector corresponding to a minimum error as the target motion vector when errors converge.

17. An electronic device comprising:
at least one processor; and
a non-transitory computer readable storage, coupled to the at least one processor and storing at least one computer executable instruction which, when executed by the at least one processor, causes the at least one processor to:
determine an error between a block to be matched and each of reference blocks to obtain a plurality of errors, wherein the block to be matched is an image block in a current frame, and the reference blocks are image blocks in a reference frame corresponding to the current frame;
determine at least one candidate block from the reference blocks according to the plurality of errors;
determine a random number range according to a displacement between the block to be matched and each of the reference blocks;
obtain random motion vectors by using a motion vector between the block to be matched and each of the at least one candidate block as a basic motion vector and random numbers within the random number range as increments; and
determine a target motion vector corresponding to the block to be matched according to the random motion vectors.

18. The electronic device of claim 17, wherein the at least one processor configured to determine the at least one candidate block from the reference blocks according to the plurality of errors is configured to:
determine, according to at least two error thresholds, a range to which the error between the block to be matched and each of the reference blocks belongs, to obtain an error distribution, wherein the error distribution is associated with determining of the at least one candidate block; and
determine the at least one candidate block from the reference blocks according to the error distribution.

19. The electronic device of claim 18, wherein the at least one processor configured to determine, according to the at least two error thresholds, the range to which the error between the block to be matched and each of the reference blocks belongs, to obtain the error distribution is configured to:
for each of the reference blocks, determine a type of the reference block according to the at least two error thresholds; and
obtain the error distribution according to the type of each of the reference blocks; wherein the at least two error thresholds comprise a first error threshold and a second error threshold greater than the first error threshold, and the at least one processor configured to determine the type of each of the reference blocks according to the at least two error thresholds is configured to:
determine the reference block as a first-type reference block on condition that an error corresponding to the reference block is lower than the first error threshold;
determine the reference block as a second-type reference block on condition that the error corresponding to the reference block is between the first error threshold and the second error threshold; or
determine a reference block as a third-type reference block on condition that the error corresponding to the reference block is higher than the second error threshold.

20. A non-transitory computer-readable storage medium storing computer programs which, when executed by a processor, are operable with the processor to:
determine an error between a block to be matched and each of reference blocks to obtain a plurality of errors, wherein the block to be matched is an image block in a current frame, and the reference blocks are image blocks in a reference frame corresponding to the current frame;
determine at least one candidate block from the reference blocks according to the plurality of errors;
determine a random number range according to a displacement between the block to be matched and each of the reference blocks;
obtain random motion vectors by using a motion vector between the block to be matched and each of the at least one candidate block as a basic motion vector and random numbers within the random number range as increments; and
determine a target motion vector corresponding to the block to be matched according to the random motion vectors.

* * * * *